(No Model.)
A. HYDE.
FRICTION CLUTCH.
No. 247,763. Patented Oct. 4, 1881.
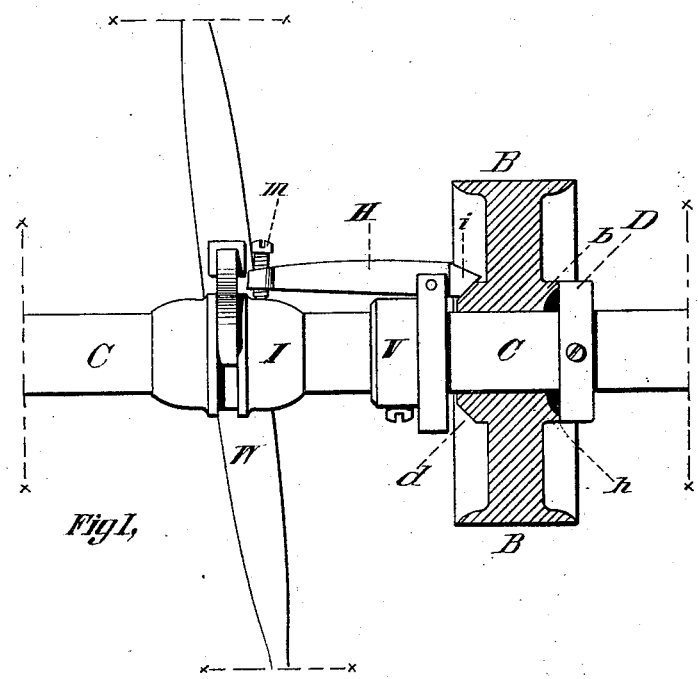
Fig I.
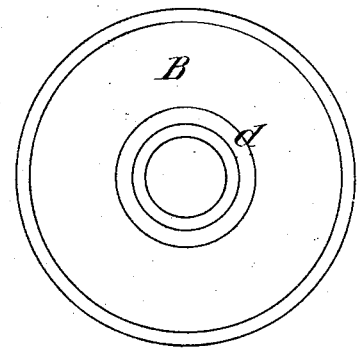
Fig II.
Witnesses,
W. H. Burrall
D. Holland
Inventor,
Andrew Hyde,
by R. I. Hyde Atty

UNITED STATES PATENT OFFICE.

ANDREW HYDE, OF HATFIELD, MASSACHUSETTS.

FRICTION-CLUTCH.

SPECIFICATION forming part of Letters Patent No. 247,763, dated October 4, 1881.

Application filed May 31, 1881. (No model.)

*To all whom it may concern:*

Be it known that I, ANDREW HYDE, a citizen of the United States, residing at Hatfield, in the county of Hampshire and State of Massachusetts, have invented a new and useful Improvement in Friction-Clutches, of which the following is a specification.

My invention relates to improvements in that class of friction-clutch in which a loose pulley provided with a friction-hub is held by clamping-levers fixed with the shaft through the action of a sliding conical hub operated by a hand-lever; and the objects of my improvements are to insure the loose pulley being held more firmly to and truly with the shaft, as well as to simplify the construction of friction-clutches by a reduction of the number of their parts. I attain these objects by the mechanism illustrated in the accompanying drawings, in which—

Figure I is an elevation, in partial section, of the entire machine; and Fig. II, a plan view of the loose pulley detached.

The pulley B (shown in the drawings in vertical section) is sleeved upon the shaft C in the usual manner, and is provided with the hub $b$, formed to have one end, $h$, come opposite the vertical side of collar D, secured to shaft C, while the other is beveled to give the friction-surface $d$ in the form of a short truncated cone.

To a collar, V, or other convenient fulcrum fixed to shaft C, is hinged the clamping-lever H, the shorter arm of which is provided with or formed into a shoe-head, $i$, coinciding in bearing-surface with surface $d$, and the longer arm in the same plane with the shaft, having its end adapted to be raised or lowered by the movement of the conical sliding hub I. The sliding hub I is of the usual form, and is operated in the manner common by the hand-lever W.

In operation, when it is desired to fix the pulley running loosely to the shaft, the raising of the longer arm of lever H brings the head $i$ forcibly to bear against the cone $d$. The pressure of the lever at the angle at which it is exerted forces the pulley to a bearing, not only against the collar D, but also to a bearing upon the shaft, so as to insure the pulley a position always at right angles to the shaft, to so avoid all aberration, and the extent of the bearing had by the hub upon shaft and collar both enables a less pressure exerted upon the hub to be effective in producing the required friction, and enables that applied through one lever to be amply sufficient.

The disadvantage inseparable from the employment of opposing cams or clamping-levers is that from various well-known causes it is practically impossible to make such duplicate friction-jaws to bear simultaneously or with equal pressure, the result of which inequality in either or both cases is that the pulley binds at a deflection from its proper angle to its axial shaft; but in this device, no matter how loosely the pulley B fits upon shaft C, it is at once brought to a bearing at right angles thereto. As shown in the drawings, the bearing-surface of head $i$ of lever H is larger than and extends above the corresponding friction-surface $d$ of the hub $b$, and the longer end of the lever is provided with the set-screw $m$, the lower end of which comes in immediate contact with the sliding cone L, by means of which an adjustment is obtained to compensate for the wear of the conical surface $d$, as well as that of the vertical surfaces of hub and collar, without recourse to the necessity of moving collar D. Were the friction-surface $h$ of the hub $b$ and of the inside of collar D to correspond in extent, any failure to perfectly coincide in contact through imperfections in mechanical finish or through the deposit of dirt around the shaft might diminish the friction or prevent it from being instantaneous; but by removing stock from one of the opposing surfaces to leave only an outer rim, as shown in the drawings, I obtain an instantaneous friction at a point where the leverage is greatest, and provide also for an escape of foreign matter.

I prefer to leave the rim upon the hub of the pulley, as the stock removed at the same time lightens the pulley.

By these means I form an exceedingly effective and simple friction-clutch.

Now, having described my invention, what I claim is—

1. The combination, with pulley B, having the hub $b$, provided with the vertical friction-surface $h$ and conical friction-surface $d$, and with shaft C', of the hinged clamping-lever H, having the head $i$ and collar D, all arranged to operate substantially in the manner and for the purpose set forth.

2. The combination, with the conical friction-surface $d$ of pulley B, and with the vertical bearing-surfaces of hub $b$ and collar D, of the hinged lever H, provided with the extended head $i$ and adjusting-screw $m$, for the purpose described.

3. The combination, with hub $b$ of pulley B, and with collar D, of the annular dust-chamber formed immediately over the shaft to leave a reduced friction-surface, as shown and described.

ANDREW HYDE.

Witnesses:
  H. K. PARSONS,
  J. E. PORTER.